(12) United States Patent  
Shelton

(10) Patent No.: US 7,846,014 B2  
(45) Date of Patent: Dec. 7, 2010

(54) ELECTRONIC INVESTMENT AND TRADING GAME WITH ENTERTAINMENT AND EDUCATIONAL PURPOSE

(75) Inventor: Sylvester Martin Shelton, Georgetown, TX (US)

(73) Assignee: Shelton Communications, LLC, Georgetown, TX (US)

( * ) Notice: Subject to any disclaimer, the term of this patent is extended or adjusted under 35 U.S.C. 154(b) by 0 days.

(21) Appl. No.: 12/402,945

(22) Filed: Mar. 12, 2009

(65) Prior Publication Data

US 2009/0233718 A1    Sep. 17, 2009

Related U.S. Application Data

(60) Provisional application No. 61/035,802, filed on Mar. 12, 2008.

(51) Int. Cl.
  A63F 13/00    (2006.01)
  G06F 17/00    (2006.01)
  A63F 13/12    (2006.01)

(52) U.S. Cl. .............. 463/9; 463/16; 463/23; 463/42; 273/138.1; 273/139; 273/461; 705/35; 705/36 R; 902/23

(58) Field of Classification Search .......... 463/1, 463/9–13, 16, 18–23, 25–27, 29–34, 42; 273/138.1, 138.2, 139, 141 A, 142 B, 142 C, 273/142 J, 142 R, 145 R, 147, 292, 454–456, 273/460–461; 705/1, 7–8, 14.17, 26, 35, 705/36 R, 37, 42, 59, 77; 700/99–102; 902/10, 902/23

See application file for complete search history.

(56) References Cited

U.S. PATENT DOCUMENTS 4,363,489 A * 12/1982 Chodak et al. .............. 273/237
4,452,457 A * 6/1984 Atieh et al. ................. 273/256
4,856,788 A * 8/1989 Fischel ....................... 273/256
5,071,135 A * 12/1991 Campbell ................... 273/256
5,388,836 A * 2/1995 Foti ........................... 273/256

(Continued)

OTHER PUBLICATIONS http://wiki.secondlife.com/wiki/Release_13Notes/Second_Life_Release/1.13#Release_Notes_for_Second_Life_1.13.1. 2856671.29_January_11.2C_2007, Linden Research, Inc., Release Notes for Second Life 1.13, Jan. 11, 2007, Linden Research, Inc., 1.13.1, 1-24.*

Primary Examiner—David L Lewis  
Assistant Examiner—Arthur O. Hall  
(74) Attorney, Agent, or Firm—Rafaty Law Group, PLLC; Vesna N. Rafaty

(57) ABSTRACT

A system and method for a computer-implemented educational investment and trading game comprising a player interface for display on player computer comprising a computer-usable medium comprising computer-executable instructions for continuous display of current values for indicia in the group comprising player account equity, where player account equity comprises cash, stocks, and bonds in a player account object, economic indicators, where economic indicators comprise economic indicators used in a real-life economy and selected by the player from a database of predefined economic indicators during a game initialization step, and current stock price for each corporation selected by the player in a game initialization step, the indicia being adjusted upon execution of each play iteration of the game, the player interface further comprising a notice of activity icon during the execution of the play iteration comprising a textual explanation of the step being executed.

4 Claims, 4 Drawing Sheets

U.S. PATENT DOCUMENTS

| | | | |
|---|---|---|---|
| 5,826,878 A * | 10/1998 | Kiyosaki et al. | 273/256 |
| 5,829,747 A * | 11/1998 | Nebel | 273/256 |
| 5,890,963 A * | 4/1999 | Yen | 463/42 |
| 6,390,472 B1 * | 5/2002 | Vinarsky | 273/278 |
| 6,446,970 B1 * | 9/2002 | Kyrollos | 273/278 |
| 6,497,410 B1 * | 12/2002 | Bernstein et al. | 273/297 |
| 6,709,330 B1 * | 3/2004 | Klein et al. | 463/9 |
| 6,890,179 B2 * | 5/2005 | Rogan et al. | 434/107 |
| 7,040,982 B1 * | 5/2006 | Jarvis et al. | 463/9 |
| 7,566,270 B2 * | 7/2009 | Amaitis et al. | 463/22 |
| 7,645,194 B2 * | 1/2010 | Van Luchene et al. | 463/25 |
| 7,677,979 B2 * | 3/2010 | Van Luchene | 463/42 |
| 7,711,628 B2 * | 5/2010 | Davie et al. | 705/37 |
| 2005/0027643 A1 * | 2/2005 | Amaitis et al. | 705/37 |
| 2005/0143174 A1 * | 6/2005 | Goldman et al. | 463/42 |
| 2005/0197938 A1 * | 9/2005 | Davie et al. | 705/35 |
| 2006/0105839 A1 * | 5/2006 | Graeve et al. | 463/42 |
| 2006/0199631 A1 * | 9/2006 | McGill et al. | 463/16 |
| 2007/0111777 A1 * | 5/2007 | Amaitis et al. | 463/16 |
| 2007/0233585 A1 * | 10/2007 | Ben Simon et al. | 705/35 |
| 2008/0288416 A1 * | 11/2008 | Arnott et al. | 705/36 R |

* cited by examiner

FIG. 4

| CORPORATION | | | | | | — 120 |
|---|---|---|---|---|---|---|
| SYMBOL | NAME | CAPITALIZATION | EPS | PRICE | RISK | DESCRIPTIVE NARRATIVE |

ELECTRONIC INVESTMENT AND TRADING GAME WITH ENTERTAINMENT AND EDUCATIONAL PURPOSE

CLAIM OF PRIORITY

This non-provisional patent application incorporates in full and claims priority to Provisional patent Application No. 61/035,802 electronically filed on Mar. 12, 2008 by the same inventor.

COPYRIGHT NOTICE

This disclosure is protected by the U.S. Copyright Laws. Specifically, and not by way of limitation, the applicant claims copyright in his creative expression relating to corporation entities disclosed herein. The applicant, S. Martin Shelton, is the sole copyright claimant. Any similarity of a name of a corporation, person, or event to a real-life corporation is unintended and is purely accidental.

BACKGROUND OF THE INVENTION

Board games are known in the prior art, including board games which relate to play simulating financial transactions. For example, U.S. Pat. No. 7,185,890 to Trivedi discloses a method and apparatus for playing a stock trading simulation game with a focus on simulating the benefits and pitfalls of bidding and speculation in financial instruments and discloses a feature whereby a player takes a hidden turn and an open turn in game play. See also U.S. Pat. No. 6,322,076 to Fikki entitled "Investment board game and method of playing same." U.S. Pat. No. 6,189,886 to Moran entitled "Board game based on stock market concepts" discloses a board game which discloses an educational purpose. The applicant's expired U.S. Pat. No. 3,539,189 entitled "Board game apparatus" discloses a board game simulating and teaching investment in a game economy.

The current disclosure incorporates some of the ideas and principles of the applicant's '189 Patent and adds new and patentability distinct and novel subject matter as described below. With the emergence of the computer and digital technology, electronic games have become popular and are known in the prior art. Electronic games are available which entertain and/or educate players via their multi-media content.

The applicant has invented and discloses herein an entertaining and educational computer-implemented interactive game and game playing method that are closely representative of a real-world equities marketplace. The applicant is not aware of prior art directed to an electronic entertaining and educational interactive multiplayer game directed to financial investment and trading. While the game universe of the disclosed game is fairly elaborate and complex and rich with features of a real-life trading scenario, the player interface is simple and player-friendly owing to the power of software code which pre-defines the complex elements of the game economy universe. Again, thanks to the power of the computer, each game play iteration can be executed with relative speed. The speed with which a play iteration may be executed promotes faster learning and familiarization with economic principles and conduct of entities in the game economy.

SUMMARY OF THE INVENTION

Disclosed is an electronic, interactive, entertaining, and educational game and method of game play for trading and investing. The game is designed to appeal to individuals with a range of knowledge of and sophistication in investment strategies and economic principles. So for example, the disclosed game appeals to individuals who are just beginning to learn about investment and trading and individuals who are sophisticated in trading and investment strategies. Players may select the level of game complexity as part of the start-up of the game. The game challenges the player/investor to act with knowledge and rational expectations to expand his/her portfolio in a near real-world scenario—reacting to chance corporate, economic, and governmental (judicial, legislative, executive) decisions and other events affecting an artificial game economy. The player and the pre-determined game construct cooperate in game iterations to create a dynamic game economy which entertains the players and can also serve to educate players about the nuanced and complex workings of a real life economy.

The preferred embodiment of the game disclosed herein assumes a U.S. economy, however the scope of the invention is not limited to a U.S. economy. The preferred embodiment of the disclosed game is an online game, namely an Internet web-hosted, multiplayer interactive game in a distributed computing environment where a very large number of players could participate in the game economy thus approximating a real life economy comprising a national or global population of investors (players). In such an environment, a player, who creates a Player Account at the start of play of the web-hosted game, has an ongoing presence via his/her respective Player Account, but plays the game at will in play sessions of intermittent nature, i.e., whenever he/she finds himself/herself at the computer and 'joins' the game. An alternative embodiment is a game model whereby an individual purchases and licenses one copy of the game for downloading and play on his/her computer with a number of other players at a single computer station.

The disclosed game is a learning tool which can be used in high school and college to teach students general business activities such as market investment strategies, economic indicators, business ethics, and vocabulary (key terms in investment, trading, and the economy). Learning takes place through relatively fast game iterations made possible by the power of the computer. The terms 'computer' and 'Master Game Control Program' shall be used interchangeably herein to refer broadly to the collection of computer-readable code comprising computer-readable instructions which both define and present to the player options for each play iteration and serve as means for automatic execution of the selected instructions via the computer. Because of the level of detail of disclosure of the features and functionalities and types of play actions contemplated by this game, a programmer of ordinary skill in the software programming arts will be able to write the necessary computer code embodying the disclosed inventive electronic game.

A player's objective is to increase his/her net worth no matter the status of the game economy. The game economy, measured by selected pre-defined indicia, changes in game play as the indicia change via play iterations. The Master Game Control Program effects changes/recalculates indicators of the game economy as appropriate at each game iteration. Each play iteration comprises two possible types of actions: 1) play action which operates to directly and immediately change the status of the game economy by effecting a change in an indicator of the game economy and 2) play action whereby a player may voluntarily engage in a stock trading transaction.

A player is engaged in a game universe where there are random computer-initiated pre-defined changes to selected indicia of the game economy and importantly in a game universe where the player is allowed to voluntarily operate on the indicia of the game economy for personal and competitive benefit and for entertainment purposes. The latter feature whereby a player has the opportunity to independently and at his/her sole discretion 'freeform' adjust indicia of the game economy for personal benefit is considered a novel feature and adds to the game dynamic. Per the latter feature the game computer presents players with an action item called Opportunities whereby a player is given the choice to play to enhance his/her financial status or degrade that of his/her opponent. So, while a real life economy does not ordinarily have the feature whereby an individual investor (as opposed to a corporate entity for example) acts principally out of a motivation to degrade an opponent's financial position, the disclosed game has this feature as an artificial construct of the game to make it more entertaining and competitive.

The game terminates for any given player when that player is bankrupt and so cannot pay his/her debts. The bankrupt player must leave the game. The computer automatically deletes his/her personal account (Player Account). The computer returns the departing player's remaining stock to the Brokerage House (as described below) and the departing player's cash to the Bank (as described below). At the beginning of the game, as part of the game initiation step, players may specify by consensus or otherwise how the game will terminate by choosing one of the following options: (1) Players set a limit on the total time to be played, wherein the player with the most net worth wins (as per the value of the Player's Account, (2) Set a monetary goal so that the player who reaches that monetary goal in his/her respective Player Account wins, (3) Play until there is only one remaining active player who is then the winner, or (4) The computer automatically sets the game duration to a specified period of time. The player with the greatest net worth (value of his/her Player Account) after the expiration of that time period wins.

The number of investors or players in the preferred embodiment of the disclosed game is variable and is typically in the range from one to ten (for individually licensed game at home computer. However, when the game is hosted on the Internet, a very large number of players is possible. The disclosed game has an entertainment value component. For example, players have the opportunity to learn the "character" of each corporation, thanks to the applicant's inventive and original, copyright-protected, pre-defined descriptive narrative about each corporation of the (initial) game universe which is limited only by the imagination of the designer of the disclosed game. The corporations that comprise the game economy typically operate in more than one industry so to be approximately representative of the broad U.S. economy comprising many industries.

Also as described herein, per an optional, innovative feature for an award, a player who attains a certain pre-determined value in his Player Account, may have the privilege of asking the game computer to input a new corporation entity, strictly as defined by the player, into the Corporation Database. Optionally, the player may have an actual controlling interest in the new real life corporation. This is a fun feature which allows a player to actually promote awareness of his/her corporate entity/corporate brand via the game economy and game play.

Per an optional feature of the disclosed game, at the start-up of a game, players may select the corporations they want to use for the game universe. For added interest, players may be identified in the Player Interface by unique monikers which each player selects from a menu of possible monikers at the beginning of the game.

With respect to the stock trading component of the disclosed game, at each play iteration, a player may selectively trade in stock of corporations voluntarily selected by the player based on his/her performance expectations about the corporation given the current indicia of the health of the game economy or based randomly on his/her feelings of connection with or knowledge in the corporation. Additionally, the computer will drive trading transactions based on the computer's randomly-selected action items (described further below) which specify instructions relating to stock trading transaction. Thus, per the disclosed invention, the computer and the player cooperate in creating a dynamic game economy.

The disclosed game is an electronic game so all records (e.g., play iterations, game universe indicators) are updated and kept as electronic records. A player may choose to print selected game records and/or game pre-defined reports on demand. Per the preferred embodiment, a player may not borrow from another player or the bank. An alternative game design may allow for such activity. Trading is conducted between the player and the Bank or the Exchange.

The key (human and non-human, software program/construct) entities per the disclosed invention are as follows: a) human Player-Investor(s) (hereinafter referred to interchangeably as investor or player, b) the Game Computer (or simply computer) which comprises the software program(s) that serve as the repository of all game data and functionalities, c) a Bank, namely a virtual entity with an unlimited supply of money, d) a Brokerage House, a virtual entity which is the repository of stock trading transactions, e) an Exchange, a virtual entity that regulates actions of investor-players, f) a Player Account, namely a virtual entity which is the repository of equities and monies belonging to a given player, g) a Game Economy, namely a virtual entity that represents an initial economy (defined by pre-set initial or default conditions) and a changed/changing economy created by game play, its status defined by several indicia including a calculated index called an Economic Picture Indicator, the game economy comprising simple databases and relational databases that include a Corporations Database (comprising a descriptive narrative, stock prices and other indicia of corporate performance such as earnings per share), securities that are traded, Events Database, comprising a pool of pre-defined textual announcements such as news releases of actions taken by the IRS, the branches of the U.S. government and the Exchange), a Directives Database comprising a pool of pre-defined action items that are instructions, automatically executed by the computer, for executing specified changes in stocks of selected corporations, an Opportunities Database comprising (1) a pool of pre-defined discrete instructions for actions in the game economy which affect players' financial positions, and (2) an option called 'freeform opportunity' inviting a player to voluntarily and independently instruct the computer to operate on selected indicia of the game economy in the player's effort to enhance his/her position or degrade that of his/her opponent, h) a Player Interface comprises player-friendly computer screen shots comprising a Graphic User Interface (GUI) which continuously displays current values for selected indicia of the game economy indicia and/or prompts the player to select from a menu (e.g. as described below: Play, Explain, Pass, Build Your Game Economy, Market Report, Player Account) of possible actions by clicking on a graphic icon for the desired action, i) Random Generator Module, namely software which comprises a random number generator program to randomly select action items to present to a player for play consistent with some pre-defined rules of selection,) a Game Clock, a software program that times and regulates the duration of each play transaction—the clock helps maintain game momentum because each player is given a limited time to select and execute a trading transaction. It is noted that a game clock is an optional feature of the disclosed invention. Players may set a time limit for requiring a player to initiating any given play transactions.

The preferred embodiment of the disclosed game has three levels of play, namely simple, moderate, and complex. Each level of play has a pre-set game universe with a unique set of features and functionalities (e.g., unique number of corporations that is all or less than all of the corporations in the Corporations Database, a unique number of Directives used in game play that is all or less than all of the items in the Directives Database, a unique number of Opportunities used is game play that is all or less than all of the items populating the Opportunities Database, etc.) consistent with the level of complexity as described below. As described above, per an optional feature of the disclosed invention, players may select from the Corporations Database the corporations to be used in any given game economy. At any time during game play, a player unfamiliar with terms used in the game or does not understand the import of an action item instruction presented to him/her during play may click on an EXPLAIN icon of the Player Interface to read an explanation or definition relating to that action item.

The following is a non-exhaustive listing of the types of securities that may be used in the disclosed game: common stock, convertible preferred stock, bonds, warrants, derivatives (Put and Call options). The types of securities used in the disclosed game are designed to closely approximate the range of securities used in a real-life economy. Per an optional feature, players may elect to use less than all of the above types of securities in any given game. The computer may maintain a Securities Database where the available types of securities are defined and maintained and may be accessed by the player via the Player Interface during for example the game initialization step where a player is prompted to specify the types of securities he/she wants to use in the game economy for a particular session of game play.

At each iteration of play, any one of a number of actions is possible to effect a change in the game economy and/or the player's personal financial situation in his/her Player Account. These actions (computer-readable instructions) are presented to players via the Player Interface by the Random Generator Module. The actions are pre-defined instructions for activity that will automatically effect a specified change in indicia of the game economy and/or indicia of a player's personal financial status and may be classified into the following categories based on the type of activity, event or actor on which the instruction operates: a) Brokerage House, b) Directive, c) Economic Indicator, d) IRS Notice, e) The Exchange, f) News Release, g) Opportunity, h) Short Sale or i) Margin Buying. The following are offered merely as examples of the types of pre-defined instructions that may populate the Opportunities Database and which may be randomly presented to the player by the computer or which a player, at his/her turn at play, may directly select from the pool of available instructions:

Player may change one or more Economic Indicators by one position.
Extend player's margin call by five plays.
Negate a Put or Call expiration.
Player may exercise a play (buy or sell) at any time.
IRS finds an error in player's IRS tax return. Bank deposits $2,500 in his/her account.
Player may purchase 100 shares of the stock of a corporation of his/her choice at a 10% discount off current price for that stock.
Player may purchase a Put or Call of 100 shares of the stocks of a corporation of his/her choice at a 10% discount.
Force an opponent to sell all shares of a corporation at a 10% premium of the current price. The player exercising that Opportunity selects the opponent's corporation.
Force an opponent to exercise his/her Put or Call Option (if any).
Force an opponent to exercise his/her warrant (if any).
Force an opponent to get an immediate margin call.
Force an opponent to the Exchange.
Force an opponent to loose a turn.

The first time a player is presented with an Opportunity play item, the computer will randomly select one of the action items populating the Opportunities Database. At the player's next turn where an opportunity is presented, the computer will randomly select an action item from the remaining items in the Opportunities Database that were not previously selected, and so on, until all of the action items populating the Opportunities Database are selected for presentation for play. Then, the game computer "shuffles the deck" and resumes the process of selection. Alternatively, the game computer may randomly present to the player via the Player Interface any of the available instructions populating the Opportunities Database, meaning any one of the instructions has an equal probability of being selected. Per yet another embodiment representing a most advanced game, the probabilities of selection of any given instruction in the Opportunities Database and/or the Directives Database, may be pre-defined at the outset by the computer (or by the user) using pre-programmed rules of probability of an event occurring in a real life economy when the real life economy has an overall economic picture that approximates that of the game economy.

Per an optional feature of the disclosed game deemed to be a novel feature, at game start-up, players may selectively define the desired unique game universe via the Player Interface feature called Build Your Game Economy whereby players are prompted by the computer in the Player Interface to click and select or de-select various game elements: number of corporations, actors (e.g., IRS, branches of the federal government, etc.), securities, economic indicators, whether the so-called 'freeform opportunity' will be used which allows a player to directly input a player-created action item into the Opportunities Database, type of desired initial game economy environment, whether bull, bear, or neutral economy. The Build Your Game Economy feature is useful in a teaching environment because the teacher can customize the complexity of the game depending upon the lesson plan. By way of example only, per a preferred embodiment of a disclosed game of simple complexity, the game universe may be pre-defined to comprise the following:

Seven (7) corporations selected from the Corporations Database:
  Abdulla's Used Camel Emporium, Inc., (AUC), small-cap/high risk.
  Amalgamated Conglomerate, Inc., (ACL), mid-cap/medium risk.
  Chimera home Construction, Inc., (CHC), mid-cap/low risk.
  Digital Photographic Company, Inc., (DP), large-cap/medium risk.
  Inter-States Railroad, Inc., (ISR), mid-cap/low risk.
  Subsonic Airways, Inc. (SAL), small-cap/high risk.
  United Communications, Inc., (UCM), large-cap/low risk.

The following five (5) Economic Indicators selected from the Economic Indicators Database:
   National Association of Home Builders: "New Housing Starts."
   Commerce Department: "Personal Spending."
   a Commerce Department: "Gross Domestic Product."
   Institute for Supply Management: "Manufacturing Index."
   Labor Department: "Non-farm Payroll Activity."
The following securities shall be used: a) common stock, b) bonds.
The IRS shall be the actor entity selected.
Categories of news releases:
   a Corporation. The computer will choose two positives and two negatives from each of the corporations, and they will be consistent throughout the game.
   a Executive, Congress, and Supreme Court. The computer will choose two positive and two negative announcements from each of the Federal Branches, and they will be consistent throughout the game.
Directives—A subset equal to 25% of all of the available items populating the Directives Database shall be used in game play. The selected directives will be evenly balanced between positive and negative.
Opportunity—A subset equal to 50% of the available items populating the Opportunities Database shall be used in game play.
For a game of moderate complexity, for example, the following 13 corporations shall define the game economy:
   Abdulla's Used Camel Emporium, Inc., (AUC), small-cap/high risk.
   Amalgamated Conglomerate, Inc., (ACL), mid-cap/medium risk.
   Carbon Chemical Company, Inc., (CCC), large-cap/low risk.
   Chimera home Construction, Inc., (CHC), mid-cap/low risk.
   Detroit Motors, Inc., (DM), large-cap/high risk.
   Digital Photographic Company, Inc., (DP), large-cap/medium risk.
   Inter-States Railroad, Inc., (ISR), mid-cap/low risk.
   Metropolitan Utilities, Inc. (MU), small-cap/low risk.
   Quantum Computer, Inc., (Q), large-cap/medium risk.
   Subsonic Airways, Inc. (SAL), small-cap/high risk.
   Super Colossal Motion-Picture Company, Inc., (SC), small-cap/high risk.
   Western-States Agriculture Ventures, Inc., (WSA), large-cap/medium risk.
   United Communications, Inc., (UCM), large cap/low risk.
The computer will use the following seven Economic Indicators.
   National Association of Home Builders: "New Housing Starts."
   Commerce Department: "Personal Spending."
   Commerce Department: "Gross Domestic Product."
   Commerce Department: "Retail Sales."
   Institute for Supply Management: "Manufacturing Index."
   Labor Department: "Non-farm Payroll Activity."
   University of Michigan: "Consumer Sentiment Index."
The Computer will include the following play items.
   IRS.
   Bonds.
   Short sale.
   Margin Buying.
   Margin Requirements.
   Margin Account Interest Rates.

News Releases:
   Corporation. The computer will choose three positives and three negatives from each of the corporations, and they will be consistent throughout the game.
   Executive, Congress, and Supreme Court. The computer will choose three positives and three negatives from each of the Federal Branches, and they will be consistent throughout the game.
   Federal Reserve. There are no News Releases from the Federal Reserve.
The computer will choose at random an item from only a percentage, by way of example only 65%, of the available items in the Directives Database. Such Directives will be evenly balanced between positive and negative.
The computer will choose at random an item from a percentage, by way of example 65%, of the available items in the Opportunities Database.

The numerical values (e.g., stock prices, percentage changes in stock prices, etc.) per the preferred embodiment of the game disclosed herein are set to resemble a real-life economy of today. However, such numerical values and settings should not be construed as limitations of the disclosed invention and are offered merely as examples. Purely fictional and randomly selected and pre-programmed values may be used.

Per another novel feature of the disclosed game, the probability of the computer selecting any given event is not always random and is instead determined by a set of probability rules that are pre-programmed in the game code based on certain assumptions and observations about real life behavior and interdependence of actors in the economy such as the IRS, the government, corporations, the Exchange, and trends in economic indicators in a real-life economy. This 'smart' feature helps make the game economy more like a real-life economy. For example, if the Current Economic Picture is a high negative value, then the probability of the federal government taking some action to try to favorably impact the economy is likely and this will be increase the probability that the next action item presented to a player is such an action.

At the Player Interface, when a player is presented with an action item randomly selected by the computer, he/she may hit PASS or PLAY. Clicking of PLAY causes the computer to present to the player a selected action item for effecting a change in the game economy or the player's personal financial position. When he/she selects play, the computer will automatically adjust the status of the game economy based on the specific action item that has been presented and while the computer is executing that instruction a Notice of Activity Icon messages to the player in real time the action the computer is taking.

At any time during the game, a player may view his/her Player's Account or so-called Investor's Summary which shows a player's personal net worth, view his/her transaction history, view a so-called Market Report which displays the current share prices for each stock, view Economic Indicators, view Economic Picture, view the Stock Service Index or SSI (as further described below; player may select the option to view a graphical display of the trend in SSI over a player-set period of time); the SSI may also be displayed continuously in one portion of the screen).

The game clock monitors and regulates the elapsed time allowed a player to exercise his/her turn at each play iteration. A player is given a limited period of time to select an action and execute an action during his/her turn. A player is typically given unlimited time to view game economy conditions on demand as described above in the Player Interface.

At each iteration of the game, the computer presents an action item via the Player Interface which may or may not require the player to take any action. For example, the action item presented may require only that the computer adjust the economic picture. If the player is invited to take an action, he/she may opt to play or pass. If the player opts to play, then he/she executes a single action per game iteration. It is noted that per an alternative embodiment of the disclosed game, a player may execute more than one action per game iteration. Thus, for example, a player may, at his/her sole discretion, select an opportunity action item from the database of Opportunities, even if the computer has not presented an opportunity action item, to advance his/her financial position or degrade the opponent player's fiscal position.

At each play transaction, a player clicks on the Play Icon and one of the action items appears in an Action Window displayed in the Player Interface. Per a preferred embodiment of the disclosed game, each category of action items has some pre-defined probability of being selected. So, by way of example only, one possible frequency of appearance of action item categories within 100 plays is noted by the number in parentheses next to each category of Action Item as follows:

Brokerage House (7)
Directive (10)
Economic Indicator (20)
IRS Notice (5)
The Exchange (8)
News Release (40)
Opportunity (10)

Once a given action item is presented, a Notice of Activity appears in the Player Interface telling the player what action the computer is taking and/or what action, if any, the player must take. After completion of that activity, the computer will randomly 'shuffle' all the action items in the just-played category of action items. After the computer executes the instruction per the selected item, the player may choose to trade or not and must do so within the time limit set at the beginning of the game.

Initial Game Economy

At the beginning of the game, the computer optionally may set all Economic Indicators to "Neutral" per the game initialization step. At the beginning of the game, the Master Game Control Program 'deposits' a fixed and equal sum of money into each Player's Account after a player has created his/her Player Account via the Player Interface. Per a preferred embodiment of the disclosed game, the following beginning conditions and parameters shall apply and are programmed into the Initial Game Economy:

Brokerage Fee: 5%
Federal Funds Interest Rate (FFIR): 5%
Stock Service Index (SSI): 687
Margin Requirement (MR): 50%
Margin Account Interest Rate: 5%

Definitions for Terms Used in the Game

The provisional patent application incorporated in its entirety provided details on definitions used in the game and so the definitions are not repeated herein. It is intended that the terms used in die game have meanings generally given to them per real life financial and investment systems. Detailed instructions about game play, terms will be made available to players in retrievable, searchable electronic form as part of the Player Interface or as instructions in a game manual.

The Corporations

The preferred embodiment of the disclosed game has twenty (20) corporations. Exemplary fictitious corporations as individual records in the disclosed Corporations Database are identified and described in detail (via parameters such as corporation name, narrative description, stock trading symbol, PE, opening stock price, earnings-per-share, dividend, capitalization, risk, etc.) in the Provisional patent application and are not repeated herein for purposes of brevity. Alternative embodiments of the disclosed game may be designed to have more or fewer corporations and the choice is limited only by the imagination of the designer of the game. The applicant has selected an exemplary group of corporations to reflect as closely as possible a significant cross-section of the U.S economy. Other types of corporations or other combinations of corporations are possible and are limited only by the game designer's imagination. The corporations are classified by their market capitalization (small, medium, or large) and risk factors (low, medium, or high). So, for purposes of the preferred embodiment of the game, a small cap corporation has a market capitalization below one-billion US dollars, a middle cap corporation has a market capitalization between one-billion and 5-billion US dollars, and a large cap corporation has a market capitalization that exceeds 5 billion US dollars. A low risk corporation is one which has a stable dividend income and slow and constant growth. A medium risk corporation pays moderate dividends and its stock value varies within a somewhat limited range. A high risk corporation pays no dividends and its stock price varies widely depending on a host of conditions. As described above, per an optional novel feature of the disclosed game, a player who attains a certain pre-determined money value in his/her Player Account may, as an award to that player, directly input a new and unique corporation record into the Corporations Database as such corporation entity is defined by that player.

Economic Indicators

Per a preferred embodiment of the disclosed game, eleven (11) Economic Indicators shows below are utilized to reflect the status of the game economy and are selected from the many others (see below) that are used today to measure die status of the real life U.S. economy. By way of example and not by way of limitation, the preferred embodiment uses Economic Indicators that are positive and generally indicate a growth in the economy. An alternative game design could incorporate a different combination of Economic Indicators. The Player Interface allows the player to click on an icon called Economic Indicators to view the game current Economic Indicators.

National Association of Home Builders: "New Housing Starts"
Commerce Department: "Personal Spending"
Commerce Department: "Durable Goods Orders" (big-ticket items)
Commerce Department: "Gross Domestic Product."
Commerce Department: "Retail Sales."
Federal Reserve Bank: "Industrial production." (Production at the nation's factories, mines, and utilities."
Institute for Supply Management: "Manufacturing Index."
Labor Department: "Non-farm Payroll Activity"
Mortgage Bankers Association: "Mortgage Originations"
National Association of Realtors: "Existing Home Sales"
University of Michigan: "Consumer Sentiment Index."

Below are additional economic indicators used in the real life U.S economy which may be utilized in the disclosed game. The Economic Indicators used in the preferred embodiment of the disclosed game are those indicating a growth in the economy and are noted below with positive numbers when reported. Conversely, some of the economic indicators, noted with a negative sign, signify an unfavorable market status when they have higher value. Per an optional feature of the disclosed game, the game computer has a link to an online database of real time values for the selected Economic Indicators. Players may access that database by clicking on Actual Economic Indicators icon and instruct the computer to apply the current values for the initial game economy.

+Bureau of Economic Analysis, "Gross Domestic Product"
−Commerce Department: "Balance of Payments" (a measure of our trade deficit)
+Commerce Department: "Building Activity"
+Commerce Department: "Personal Income"
+Commerce Department: "Personal Spending"
+Commerce Department: "Gross Domestic Product."
+Commerce Department: "Durable Goods Orders (big-ticket items)
+Commerce Department: "Factory Orders"
+Commerce Department: "Personal Income"
+Commerce Department: "Personal Spending"
+Commerce Department: "Residential Building Construction"
+Commerce Department: "Retail Sales"
+Conference Board (a non-profit research organization in NYC: "Composite Index of Leading Economic Indicators"
+Conference Board: "Consumer Confidence Index"
+Federal Reserve: "Industrial production." (production at the nation's factories, mines, and utilities, and capacity utilization"
+Federal Reserve: "Beige Book Report on Manufacturing Activity"
−Freddie Mac: "Mortgage Rates" (a weekly report)
+Institute for Supply Management: "Manufacturing index"
+Institute for Supply Management: "Index for Non-manufacturing Business"
−Labor Department: "Consumer Price Index"
−Labor Department: "Employment Cost Index"
+Labor Department: "Job Growth"
−Labor Department: "New Claims for Unemployment Benefits"
+Labor Department: "Non-farm Payroll Activity"
+Labor Department: "Payroll Activity"
+Labor Department: "Producer Price Index"
−Labor Department: "Unemployment Rate"
+Labor Department: "Worker Productivity"
+Mortgage Bankers Association: "Mortgage Originations"
−Mortgage Bankers Association: "Refinance Index"
+National Association of Home Builders: "New Housing Sales"
+National Association of Home Builders: "New Housing Starts"
+National Association of Realtors: "Existing Home Sales"
+University of Michigan: "Consumer Sentiment Index"

Economic Picture

The Economic Picture is a numerical construct of the disclosed game which reflects the overall health of the game economy. A different numerical construct may be used and such is limited only by the imagination of the designer of the game. The Economic Picture per the disclosed game is determined by the eleven Economic Indicators. An Economic Indicator may be one of the following: "Up," "Neutral," or "Down." The Economic Picture is the numerical value that is determined by the difference between the Ups and the Downs, i.e., by subtracting the number of Downs from the number of Ups. Accordingly, per the preferred embodiment of the disclosed game which utilizes eleven selected Economic Indicators, the Economic Picture can range from Up+11, to Down−11. When the Economic Picture is positive (more Ups than Downs), then the game economy is a so-called Bull Market. A Bull Market bodes well for economic growth and overall stock market appreciation. For example, an Economic Picture of +3 indicates a budding Bull Market. Conversely, when the Economic Picture is Negative (more Downs than Ups), the game is in a Bear Market. A Bear Market suggests a slowing economy and declining stock market. So for example, an Economic Picture of −3 indicates a burgeoning Bear Market. Per the Player Interface, the current value for the Economic Picture is continually displayed on the computer screen or alternatively, a player may view on demand the current value for the Economic Picture by clicking on an Economic Picture Icon. The feature whereby the Player Interface presents the current Economic Picture for the game economy helps to inform a player's next move in the play iteration.

The Economic Picture is used in the disclosed game as the multiplier for effecting changes in stock prices as per the Directives which instruct changes in stock prices. The applicant proposes, by way of example and not by way of limitation, the following Economic Picture Price Factors:

Economic Picture Price Factors

| Economic Picture | Low Risk Stocks | Medium Risk Stocks | High Risk Stocks |
|---|---|---|---|
| +11 | +1.60 | +1.85 | +2.00 |
| +10 | +1.50 | +1.70 | +1.85 |
| +9 | +1.41 | +1.59 | +1.75 |
| +8 | +1.35 | +1.50 | +1.66 |
| +7 | +1.31 | +1.42 | +1.60 |
| +6 | +1.28 | +1.35 | +1.52 |
| +5 | +1.25 | +1.30 | +1.43 |
| +4 | +1.23 | +1.28 | +1.35 |
| +3 | +1.20 | +1.25 | +1.29 |
| +2 | +1.15 | +1.20 | +1.24 |
| +1 | +1.10 | +1.10 | +1.20 |
| 0 | +1.00 | +1.00 | +1.00 |
| −1 | −1.10 | −1.10 | −1.20 |
| −2 | −1.15 | −1.20 | −1.24 |
| −3 | −1.20 | −1.25 | −1.29 |
| −4 | −1.23 | −1.28 | −1.35 |
| −5 | −1.25 | −1.30 | −1.43 |
| −6 | −1.28 | −1.35 | −1.52 |
| −7 | −1.31 | −1.42 | −1.60 |
| −8 | −1.35 | −1.50 | −1.66 |
| −9 | −1.41 | −1.59 | −1.75 |
| −10 | −1.50 | −1.70 | −1.85 |
| −11 | −1.60 | −1.85 | −2.00 |

Changes in Economic Indicators occur in one of two ways. Firstly, in play, a player may be presented with an action item called Economic Indicator which is an instruction for making a specified change in a selected Economic Indicator(s). The game computer automatically executes that instruction. When the computer has made the changes, the computer also automatically re-calculates the new, adjusted Economic Picture. Alternatively, a player may be presented with an action item called Economic Indicator which has an instruction which states the player may instruct the computer to change the value of one or more Economic Indicators from their current value to another value (from Up to Neutral for example) as per the player's wishes. The Player Interface prompts the user to select from an Economic Indicators List, touch screen the new value for the user-selected Economic indicator(s). In this way, a player may act competitively or may effect changes in the game economy which approximate the realities of the player's real-life economy. Again, the game computer automatically executes changes the values of the selected Economic Indicators and re-calculates the Economic Picture.

Directives

A Directive is an action item selected by the computer and presented by the Player Interface which instructs the computer to automatically make a specified change in the stock prices of a select corporation(s). As described above, once the computer selects any given item in the Directives Database, the next selected item from that database may be randomly chosen from the Directives Database or the next item presented to the player may be selected by the computer based on pre-defined rules about probabilities of occurrence of select directives items.

Sample Directives items are as follows:

Select one corporation and change its price by one or more percentage points up or down (e.g., ±2%).

Select one or more of the low-risk corporations and change their stock price by one or more percentage points up or down (e.g., ±4%).

Select one or more of the medium-risk corporations and change their stock price by one or more percentage points up or down (e.g., ±7%).

Select one or more of the high-risk corporations and change their stock price by one or more percentage points up or down (e.g., ±9%).

The computer automatically makes the corporate stock price adjustments as per the specific Directive that comes up during play action. The computer makes the required changes by multiplying stock prices by the Directive-mandated percent change, and multiplying the result by the current Economic Price Factor. After each stock price change, the game computer automatically recalculates the Stock Service Index. Just as the Player Interface continually displays the current Economic Picture, it also continually displays the current value of the SSI.

On positive news from the Executive, Congress, and the Supreme Court:
Low-Risk stocks up 2%
Medium-Risk stocks up 5%
High-Risk stocks up 10%

On negative news from the Executive, Congress, and the Supreme Court:
Low-Risk stocks down 2%
Medium-Risk stocks down 5%
High-Risk stocks down 10%

For example: the current price for Quantum Computer, Inc. is $100—a medium risk stock. A Directive calls for a 7% increase in Q's stock. The Economic Picture at the time of that transaction is +4. Accordingly, the computer calculates the Economic Price Factor to be +1.28. In response to the directive, the computer then automatically calculates the price change of Q's stock as follows:

$100×0.07(7%)×+1.28=+$8.96 or +$9. The final price is +$9+$100=$109.

News Releases

The News Release category of action items contains announcements about events, actions, conditions of certain actors in the economy such as the government. Sample items in the News Release category are the following and are limited only by the imagination of the designer of the game:

Executive Branch of the Government

1. +President asks Congress for a tax decrease bill.

2. +The Attorney General announces that the Head of La Cosa Nostra is arrested.

3. +The Secretary of State negotiates and signs peace treaty with Luxemburg.

4. +The Secretary of Defense cuts 10 battleships from current Defense budget proposal.

5. −President asks Congress for a tax increase bill.

6. −Postmaster General asks Congress for a rate increase for first-class mail.

7. −The Secretary of Agriculture cuts subsidies for peanut farmers.

Congress

1. +The Speaker of the House of Representatives asks his/her party for a tax decrease bill.

2. +The Chairman of the House Rules Committee kills the proposed One-Party Rule Bill 3 +The Chairman of the House Oversight Committee kills a colleague's fact-finding trip to the French Riviera.

5. −The Speaker of the House of Representatives asks his Party for a tax increase bill.

6. −The Speaker of the House of Representatives challenges the President on his environmental policy.

7. +Senate Majority Leader backs a tax decrease bill.

8. +Senate Majority Leader is convening a Select Committee to investigate lax oversight in the counting of the endangered whooping crane.

9. −Senate Majority Leader backs a tax increase bill.

10. −Senate Majority Leader challenges the President on his economic policy.

The Supreme Court

1. +The Chief Justice announces, in a unanimous decision, that the Second Amendment is a personal right.

2. +The Chief Justices announces, in a 6 to 3 Justices' decision, that in criminal and civil cases "the nature of the charge" cannot take precedence over "the nature of the evidence".

3. −The Chief Justice announces, in a 5 to 4 Court decision, that Article 16 of the U.S. Constitution is valid.

4. −The Chief Justice announces, in a unanimous decision, that adult pornography is protected under the First Amendment.

All equity price changes are multiplied by the Economic Picture Price Factor at the time of play. Excepted are those changes directed by News Releases from the Federal Reserve System.

The Federal Reserve System/Federal Funds Interest Rate

The Federal Reserve is the central banking system of the U.S. whose purpose is to regulate the money supply and credit—which in turn control inflation and deflation. The Federal Reserve System is comprised of the Federal Reserve Board, the 12 Federal Reserve Banks, and the national and state member banks. The Federal Reserve System, through its Federal Open Market Committee, sets the Federal Funds Interest Rate by varying the interest rate the Bank pays on Treasury Bills. This interest rate is what the banks charge each other for the use of federal funds and to make loans. Such interest rates directly affect commercial interest rates. Accordingly, the higher is the Federal Funds Interest Rate, the more it controls inflation because it is more expensive to borrow money—the staple of commerce. Commercial enterprises borrow money to invest in entrepreneurial ventures that create new products and services and help to create jobs. Conversely, the lower the Federal Funds Rate, the more it stimulates the economy because it cost less to borrow money to invest in commerce.

As the Federal Funds Interest Rate increases, share prices decrease and bond prices increase.

As the Federal Funds Interest Rate decreases, share prices increase and bond prices decrease.

At the start of the disclosed game, the Federal Funds Interest Rate is set to be 5%. Sometime shortly after the Economic Picture reaches either +3 or −3, the Federal Reserve Chairman may announce a change in the Federal Funds Rate and this is shown by a News Release action item that may be presented in the Player Interface during a play iteration. The prices of equities affected by the interest change are not multiplied by the Economic Price Factors. Changes in the Federal Funds Interest Rate occur throughout die game in accordance with a pre-programmed algorithm which depends from the Economic Picture present in the game economy.

More about Action Item Categories

Brokerage House. When this icon appears, the computer pays dividends and interest on bonds, and collects interest on margin accounts.

IRS Notice. An IRS Notice action item will cause the game computer to automatically change the value of the Player's Account by adjusting for the amount of payment of IRS federal income taxes that have become due and payable as specified in the IRS action instruction. As for other action item categories, there may be a preset frequency of occurrence for the computer's selection of an IRS action item. A sample frequency of occurrence may be once per every 50 play transactions for any given player.

The Exchange. One of the following randomly-generated announcements may be presented by the computer at any given play step and will serve to effect a change in the players' personal financial position in the Player's Account:

Your margins are called. The player must cover his/her margins within the next five (as example) plays. If not paid on the player's sixth play, the computer automatically deducts cash from the Player's Account to cover the margin amount due. If there is not enough money in the Player's Account, the computer automatically sells a stock of its choice from the player's portfolio to raise the cash needed. In a Notice of Activity Window in the Player Interface, the computer notifies the player of the action taken.

Your short sales are called. The player must cover his/her short sales within his/her next five (as example) plays. If not, the computer automatically makes the appropriate action and adjusts the Player's Account accordingly.

Your warrants will expire. The player must exercise the warrants within his/her next five (as example) plays or they will expire.

Your Puts and Calls will expire. The player must exercise the options within his/her next five (as example) plays or they will expire.

Should none of the above four items appear because they do not apply, the Exchange automatically deposits say a sum of $2,000 to the Player's Account in recognition of the player being a responsible investor.

News Release. This action item presents a textual message that disseminates information that investors and the public need to know. A News Release can relate to actors such as but not limited to a corporation, the IRS, a branch of the federal government, or the Federal Reserve System. Sample announcements relating to a corporation may relate to one or more of the following elements: the corporation's periodic earnings report, the number of shares outstanding, debt ratio, or brand recognition and customer loyalty. Per an educational, interactive aspect of the game, when a particular News Release action item is presented in the Player Interface during game play, a teacher may pause the game play and use the opportunity to invite discussion about the possible impact of the news item on economic indicators such as but not limited to investor confidence.

Derivatives (Puts and Calls) If a Derivatives Action Item is presented to a player who is unfamiliar with that type of security, he/she may click on the EXPLAIN icon to access a knowledge database containing definitions of terms. An investor buys a Put if he/she believes the stock's price will decline. A Put is an option to sell a specific numbers of shares at a predetermined price, called the strike price, at a fix time in the future—the expiration date. In essence, when it is profitable an investor exercises a Put, her sells the share at the strike price and immediately buys them at the current price—lower than the sell price. Profit is the difference between the stock's strike price and its current price. If the option is not exercised within the expiration date, it expires and is worthless. An investor buys a Call if he/she believes the stock's price will advance. A Call is an option to buy a specific numbers of shares at a predetermined price before a fix time in the future—the expiration date. When it is profitable the investor exercises a Call by buying the stock at the current price and sells it at the strike price. Profit is the difference between the stock's current price and its strike price. If the option is not exercised within the expiration date it expires and is worthless. The price of a Put or Call depends on two factors The price of the corporation at the time of purchase. In this game, for simplicity, the price of a Put or Call is always 110% of the underlying corporation' price How far in the future is the expiration date. Again for simplicity, the expiration date is the Exchange Action Item that says "Your Puts and Calls will expire" within your next five plays.

Short Sale—Should an investor decide that a stock will decline he/she may earn money by selling the stock short. To make this deal the investor borrows the stock from the Brokerage House, sells the stock, and adds the cash from the sale to his/her Play Account. The investor now owes the Brokerage House the number of shares he/she has borrowed—not the amount of money he/she has realized from the sale. Nonetheless, he/she pays interest on the amount of money realized from the sale. The interest rate is Federal Funds Rate plus 4%. At some time in the future, the investor must repay the Brokerage House the same number of share he/she has borrowed. That is, the investors buy the shares on the market and send them to the Brokerage House to repay the load. The computer will complete this transfer after the investor purchases the shares.

Margin Buying A player may purchase equities on the "Margin." In such a buy, the player pays only a percentage of the total cost of the purchase. He/she borrows the balance of funds needed to complete the purchase from the Brokerage House. He/she must pay interest on the borrowed amount. Per the preferred embodiment of the game, by way of example only and not by way of limitation, the margin account interest is twice the Federal Funds Interest Rate. The computer automatically adjusts the interest on margin accounts as follows:

When the Economic Condition is +3 to +5, the interest rate rise 1.0%.

When the Economic Condition is +6 to +11, the interest rate rises 2.0%.

When the Economic Condition is −3 to −5, the interest rate declines 1.0%.

When the Economic Condition is −6 to −11, the interest rate declines 2.0%.

Margin Requirements (MR) When a player borrows to purchase equities, he/she must meet the Margin Requirements. The Margin Requirement is the value of equity (stocks, bonds, and cash) the must be in a player's account that can be used for collateral. Such borrowing to purchase equities is called buying on the margin. The Federal Reserve Bank sets the Margin Requirements (MR). The MR is based on the Federal Funds Interest Rate (FFIR). The Margin Requirement changes with the FFIR. At the beginning of the game the FFIR is 5%. When the FFIR is below 5% the MR is 30%. When the FFIR is at 5% the MR is 50%. When the FFIR above 5% the MR is 70%. For example, a player purchases 100 shares of Consumer's Retail Emporium, Inc. (CRE) at $70 per share. Total price is $7,000. Purchased on the 50% margin, the player pays $3,500, and the Brokerage House lends to the player an amount equal to $3,500. The player pays interest on the $3,500 loan. When changes in the FFIR cause an increase in the Margin Requirements, the Brokerage House issues a "Margin Call"—margin—account investors must ante cash to cover the balance due. On a margin-account investor's next play, he/she must comply with the new margin requirement by paying the Brokerage House the required cash. The computer will calculate the amount owed and deduct this amount from his/her cash account. For example, an investor purchases 100 shares of Inter-States Railroad, Inc. (ISR) at $50 per share: total cost is $5,000. At a 50% margin requirement, the investor pays only $2,500. The Brokerage House lends the investor the remaining $2,500. Should the Margin Requirement change to 70%, the investor must ante $1,000 to cover the amount due. Here's the math: At 70% MR the amount a player needs to pay for this purchase is $3,500 (70%×$5,000=$3,500). Since the player paid only $2,500, he/she owes $1,000—the difference between $3,500 and $2,500. The computer makes the change and notifies the player. If a margin-account investor does not have enough cash in his/her account to cover the margin call, the computer (via the Brokerage House) will sell equities in the investor's account and use the proceeds to cover the cash requirement. Conversely, when the margin requirement decreases, in some instances this decrease will give the margin-account investor more purchasing power through increased ability to borrow more money to purchase equities. The game computer calculates the new amount and notifies the investor.

BRIEF DESCRIPTION OF THE DRAWINGS

FIG. 4 shows exemplary fields of a record entry in the Corporations Database;

DESCRIPTION OF THE DRAWINGS

Figure 1:
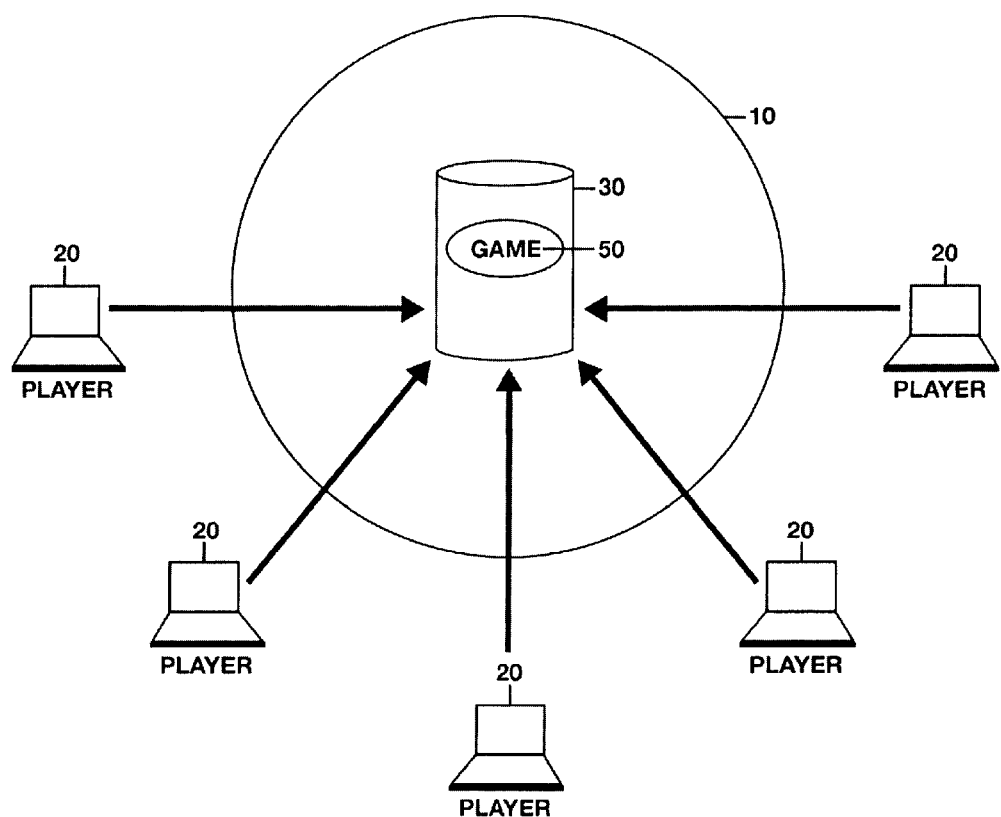
FIG. 1 is a rough schematic of a preferred embodiment of the disclosed game for multiplayer online play in a web-hosted environment over the Internet.

FIG. 1 shows the disclosed electronic game 50 hosted on a Game Server 30 over the Internet 10 where players access the game 50 via browsers of each player's computer 20.

Figure 2:
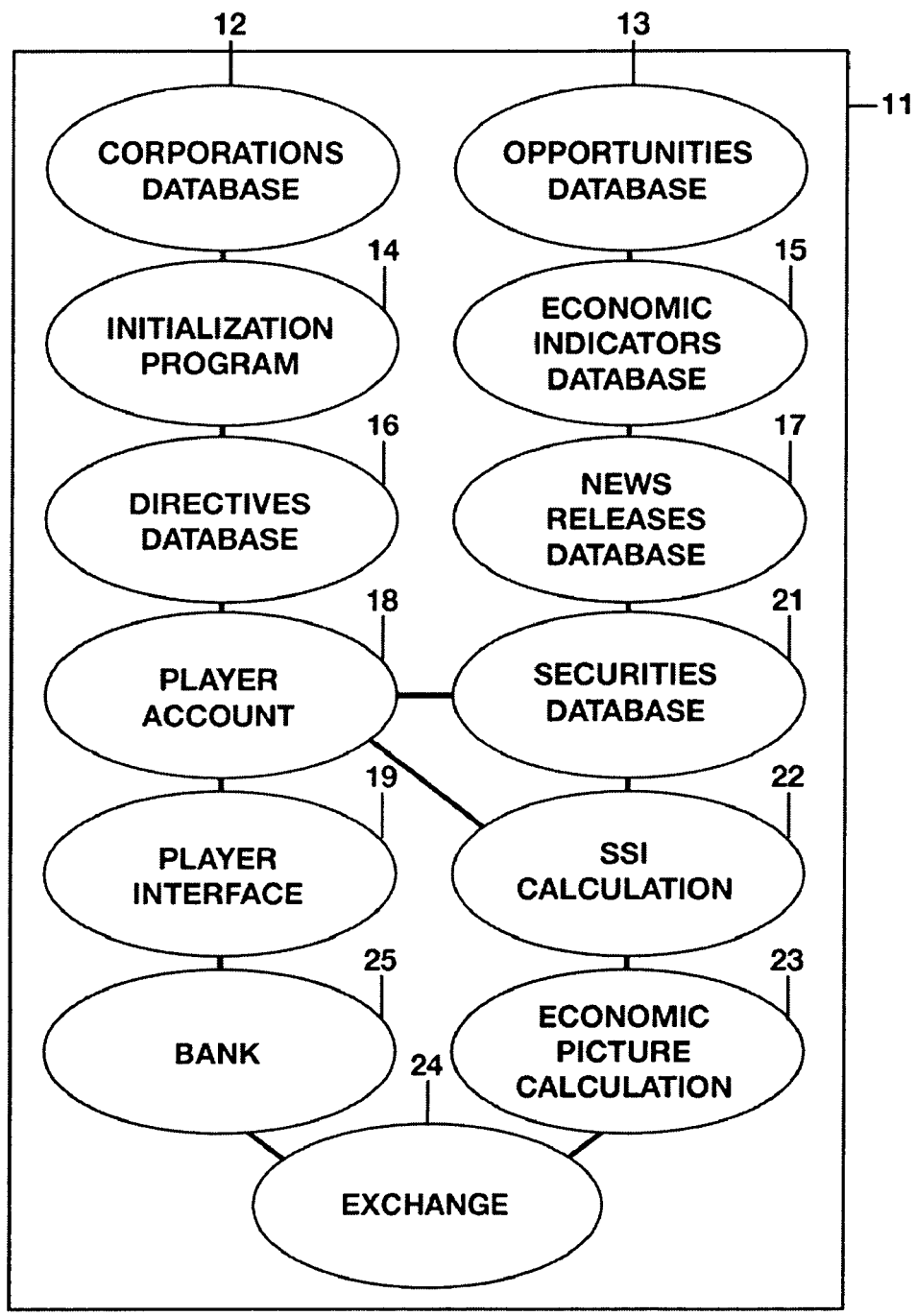
FIG. 2 shows the major discrete component programs that comprise the software program that embodies the disclosed electronic game.

FIG. 2 shows the major discrete component programs that comprise the software program 11 that embodies the disclosed electronic game. The component programs include relational databases, simple databases, and run/execution programs, Shown are a Corporations Database 12, an Opportunities Database 13, an Initiation Program 14, an Economic Indicators Database 15, a Directives Database 16, a News Release Database 17, Player Accounts 18, a Securities Database 21, a Bank 25, an Exchange 24, a Player Interface 19, an SSI Calculation Program 22, and an Economic Picture Calculation Program 23.

Figure 3:
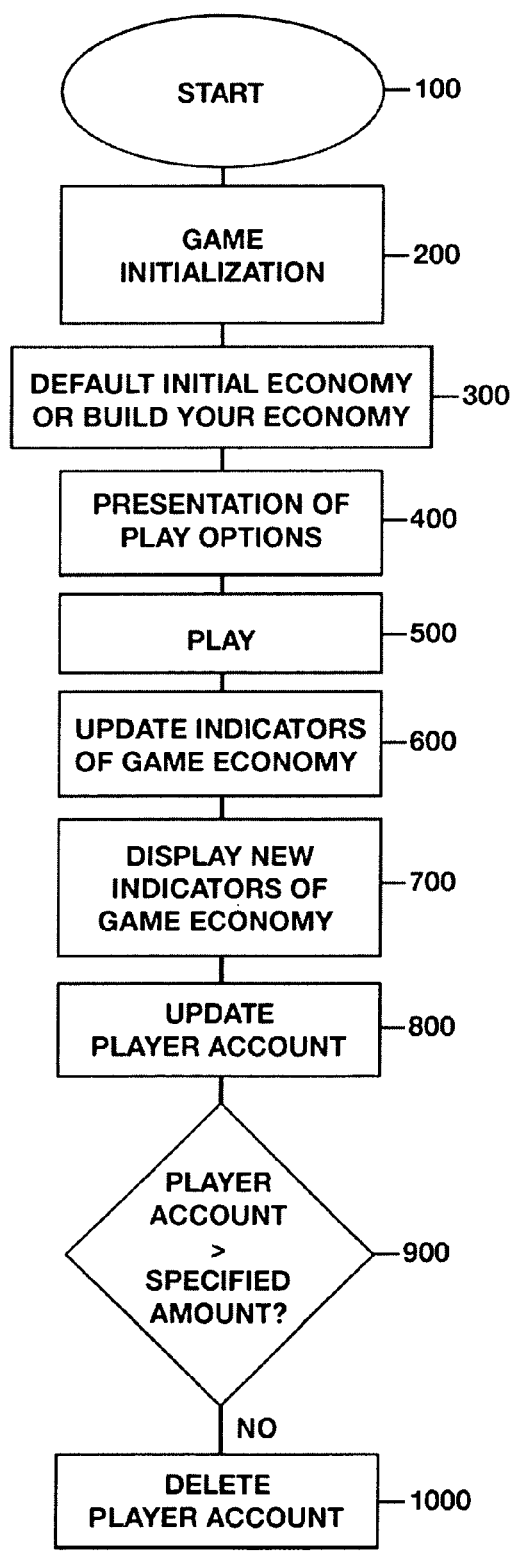
FIG. 3 is a flowchart showing major functional steps of the Master Game Control Program that controls game play.

FIG. 3 is a flowchart showing only the major functional steps of the Master Game Control Program that controls game play. The program starts at Step 100. In the Game Initialization Step 200, the computer and the player (via the Player Interface) specify and display several initialization setpoints for game parameters. In Step 300, a player may elect to use the computer pre-set Initial Game Economy parameters or alternatively the player may elect to Build Your Economy. Game play effectively begins at Step 400 called herein 'Presentation of Play Options.' At Step 400, the computer presents action items/instructions (such as Directives and Opportunities for example). At step 500, a player selects an action item/instruction. At Step 500, the player may seek helpful information about the contemplated action item/instruction by clicking on the EXPLAIN icon per the Player Interface. The computer executes the selected action/instruction in Step 600, Update Indicators of Game Economy (and the execution step may optionally be highlighted via a Notice of Activity flag visible via the Player Interface). The computer then displays newly-adjusted indicators (e.g. Economic Picture, SSI, etc.) for the game economy in Step 700. At Step 800, the computer then updates the Player's Account based on the just-executed action item/instruction. At Step 900, if the Player's Account has a value that is greater than a pre-specified amount (specified in Step 300), that player may remain in the game while the next player is then presented a play option at Step 400 thus launching a new iteration of play. At Step 900, it is noted that a player may be entitled to an award, exercisable by the player at his/her next play, whereby that player may input a new corporation record into the Corporation Database. If the player is entitled to such an award, the computer will send him/her an award message visible in the player's Player Interface, If a Player Account is below a pre-set value, that player's account may be deleted from further play per Step 1000.

FIG. 4 shows exemplary fields of a record entry 120 in the Corporations Database 12. Shown are fields entitled symbol (corporation symbol on the Exchange), corporation name, level of capitalization, earnings-per-share, stock price, risk, and a narrative description of the corporation. The shown record entry 120 is not intended to be limiting as numerous additional data fields could be incorporated for each corporation record in the Corporations Database.

I claim:

1. In an entertaining and educational investment and trading video game, a non-transitory computer-readable medium having program code embodied therein configured to cause the execution of the following steps:

i. Prompting a player to select a plurality of corporations from a database of corporations, wherein each corporation record in the database of corporations has a predefined initial value for the attributes of stock price, earnings-per-share, level of risk, capitalization, and descriptive narrative of a history of the corporation adding entertainment value to the game;

ii. Prompting the player to select a game complexity level linked to the player's selection of one or more predefined objects from a securities database, a database of economic indicators, and a database of actors, wherein the database of securities comprises stocks, bonds, warrants, and derivatives, the database of economic indicators comprises economic indicators used in a real-life economy, and the database of actors comprises an Exchange, a Brokerage House, an Internal Revenue Service, a legislature, and a U.S. Supreme Court;

iii. Automatically presenting a play option to the player, each play option comprising a selection of a directive from a database of directives and a selection of an opportunity from a database of opportunities, wherein each directive in the database of directives comprises an instruction that causes a change in the stock price of a corporation, and wherein each opportunity in the database of opportunities comprises an instruction that changes the financial position of the player or an opposing player, and wherein furthermore the probability of presentation of the selections is determined by pre-defined rules linked to a behavior of a real-life economy given a current value for each of the economic indicators;

iv. Automatically executing the play option, v. Prompting the player to optionally engage in an investment or trade transaction and then automatically executing the transaction if the player elects to engage in an investment or trade transaction, vi. Continuously displaying current values for the economic indicators, corporation stock prices, and player account equity, where player account equity comprises values for cash, stock, and bonds in a player account;

vii. Automatically verifying the current value of the player account equity and deleting the player account if the value is zero or less, and viii. Iteratively presenting a new play option per Step iii above and executing Steps iv through vii, for each player whose player account equity is greater than zero.

2. The non-transitory computer-readable medium per claim 1 having program code embodied therein further configured to prompt the player to optionally input into the database of corporations a corporation record for a corporation linked to a real-life corporation in which the player has a controlling interest, the player directly inputting values for the corporation's attributes of stock price, level of risk, capitalization, and descriptive narrative of a history of the corporation.

3. A system for conducting an educational and entertaining investment and trading game comprising:

a master game server computer and a plurality of player computers in communication with the master game server computer over the Internet, each of the plurality of player computers comprising a graphical display device that displays prompts and game information to a player, the master game server computer configured with a processor causing the execution of the following steps:

i. Prompting the player to select a plurality of corporations from a database of corporations, wherein each corporation record in the database of corporations has a predefined initial value for the attributes of stock price, earnings-per-share, level of risk, capitalization, and descriptive narrative of a history of the corporation adding entertainment value to the game;

ii. Prompting the player to select a game complexity level linked to the player's selection of one or more predefined objects from a securities database, a database of economic indicators, and a database of actors, wherein the database of securities comprises stocks, bonds, warrants, and derivatives, the database of economic indicators comprises economic indicators used in a real-life economy, and the database of actors comprises an Exchange, a Brokerage House, an Internal Revenue Service, a legislature, and a U.S. Supreme Court;

iii. Automatically presenting a play option to the player, each play option comprising a selection of a directive from a database of directives and a selection of an opportunity from a database of opportunities, wherein each directive in the database of directives comprises an instruction that causes a change in a stock price of a corporation, and wherein each opportunity in the database of opportunities comprises an instruction that changes the financial position of the player or an opposing player, and wherein furthermore the probability of presentation of the selections is determined by pre-defined rules linked to a behavior of a real-life economy given a current value for each of the economic indicators;

iv. Automatically executing the play option;

v. Prompting the player to optionally engage in an investment or trade transaction and then automatically executing the transaction if the player elects to engage in an investment or trade transaction;

vi. Continuously displaying on the graphical display device of each of the plurality of player computers current values for the economic indicators, corporation stock prices, and player account equity, wherein player account equity comprises values for cash, stock, and bonds in a player account;

vii. Automatically verging the current value of the player account equity and deleting the player account if the value is zero or less, and viii. Iteratively presenting a new play option per Step iii above and executing Steps iv through vii, for each player whose player account equity is greater than zero.

4. The system per claim 3 wherein the processor of the master game server computer further causes the automatic display of a notice of activity icon during the execution of the play option per step iv, the notice of activity icon comprising a textual explanation of the play option being executed, the display via the graphical display device of each of the plurality of player computers.

* * * * *